April 18, 1961          O. F. GERRY          2,979,817

ELECTRIC CAN OPENER WITH CONTROL INTERLOCK

Filed Aug. 28, 1959          2 Sheets-Sheet 1

Inventor:
Otto F. Gerry,
by T. G. Dupont
His Attorney.

April 18, 1961   O. F. GERRY   2,979,817
ELECTRIC CAN OPENER WITH CONTROL INTERLOCK
Filed Aug. 28, 1959   2 Sheets-Sheet 2

Inventor:
Otto F. Gerry,
by TG Dupont
His Attorney.

United States Patent Office 2,979,817
Patented Apr. 18, 1961

2,979,817

ELECTRIC CAN OPENER WITH CONTROL INTERLOCK

Otto F. Gerry, Clarkson, N.Y., assignor to General Electric Company, a corporation of New York Filed Aug. 28, 1959, Ser. No. 836,741

5 Claims. (Cl. 30—4)

This invention relates to automatic electric can openers, and has as its principal object the provision of an improved can opener provided with a control interlock system so arranged that the device may be energized only after the cutting mechanism has been shifted into its can engaging position.

Further objects and advantages of the invention will become apparent as the following description proceeds, and the features of novelty which characterize the invention will be pointed out with particularity in the claims appended to and forming a part of this specification.

Briefly stated, in one embodiment of my invention I provide an electric can opener including a cutter which may be manually shifted by means of a lever between an inoperative position and a cutting position, electrically powered means for supporting and rotating a can with its lid in contact with the cutter, a control switch, a pushbutton for actuating the control switch, and an interlock plate associated with the cutter shifting lever and the pushbutton so as to prevent actuation of the latter unless the cutter has been moved to its cutting position.

For a better understanding of the invention, reference may be made to the following description and the accompanying drawing in which.

Figure 1:
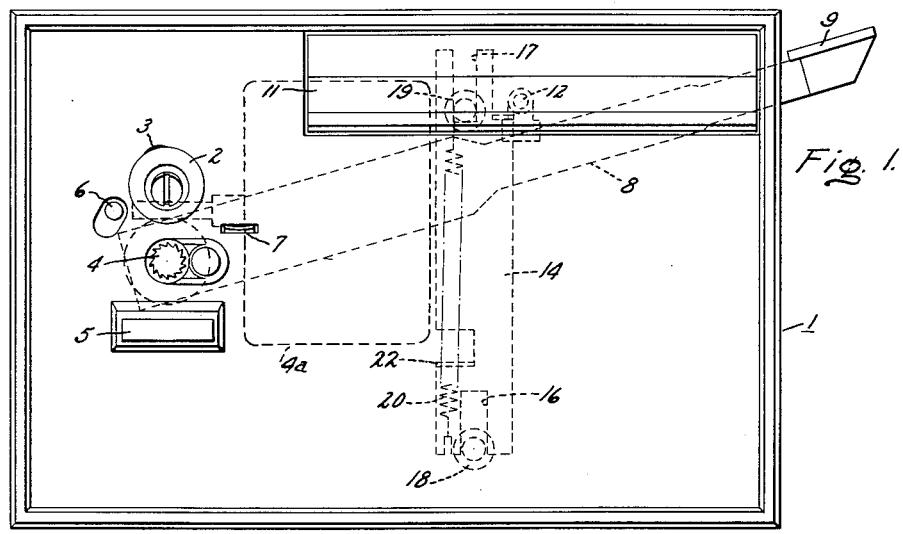
Fig. 1 is a front elevation view of a can opener embodying the present invention.
Figure 2:
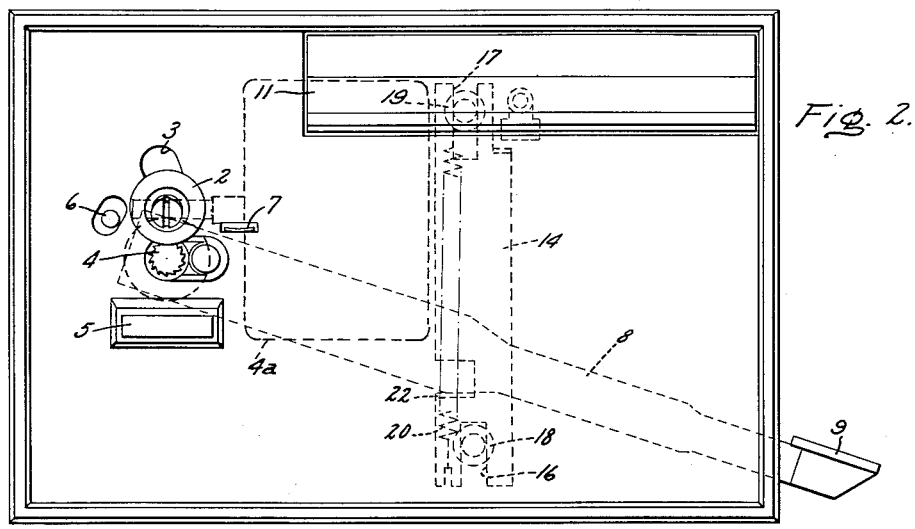
Fig. 2 is similar to Fig. 1, but shows the parts in a different position.

Referring to the drawing, the reference numeral 1 designates the casing of an electric can opener having a rotary cutter 2 mounted for movement between an upper inoperative position, shown in Fig. 1, and a lower cutting position, shown in Fig. 2. Cutter 2 is rotatably mounted on a stub shaft secured to a movable plate (not shown) located within the casing, the stub shaft being positioned so as to project through an elongated opening 3 in the front wall of casing 1. Cutter 2 is arranged to cooperate with a can supporting and driving wheel 4, can supporting pad 5, and can rim engaging elements 6 and 7, all of which extend forwardly from the front wall of casing 1. Wheel 4 is connected by suitable gearing to an electric motor 4a, and is arranged to support the beaded edge of a can so that cutter 2 may be lowered into cutting engagement with the peripheral edge of the lid of the can.

Cutter wheel 2 is manually movable from the inoperative position shown in Fig. 1 to the cutting position shown in Fig. 2 by means of a lever 8 pivotally secured with respect to casing 1 for movement about the axis of drive wheel 4 and operatively connected to the stub shaft on which cutter 2 is mounted. The free end of lever 8 extends through a side wall of casing 1 and a handle 9 is secured thereto so that the lever may be manually shifted between the positions shown in Figs. 1 and 2.

Figure 4:
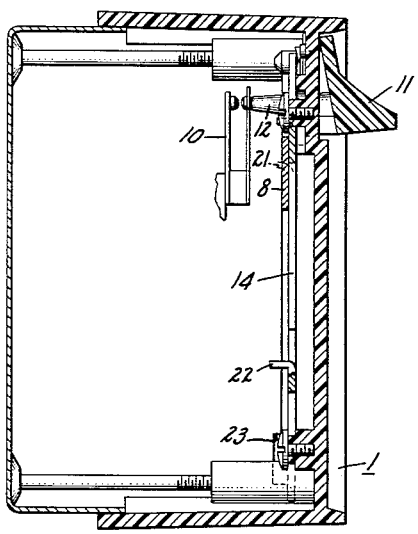
Fig. 4 is a cross-sectional view taken along the line 4—4 in Fig. 3.
Figure 6:
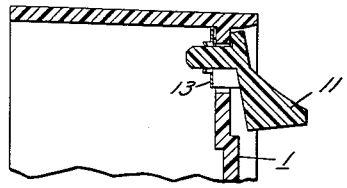
Fig. 6 is a fragmentary cross-sectional view taken along the line 6—6 in Fig. 3.
Figure 5:
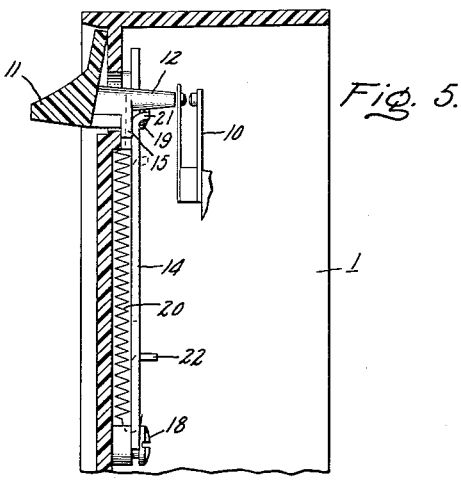
Fig. 5 is a fragmentary cross-sectional view taken along the line 5—5 in Fig. 3.

Mounted within casing 1 is an electric switch 10 connected in circuit with the motor which drives drive wheel 4, switch 10 being of the type which is normally open and which is closed by movement of a plunger associated with a manually operable pushbutton. As best shown in Figs. 4 and 5, a pivotally mounted pushbutton 11 having a plunger 12 is secured to the front of casing 1 so that it may be conveniently actuated by the user. Pushbutton 11 is in the present embodiment an elongated bar mounted on casing 1 by means of a pair of spring hinges 13 for pivotal movement about an axis extending along the top edge of the casing. Thus when it is desired to energize the can opener, switch 10 is closed by depressing pushbutton 11 so as to move plunger 12 into engagement with the switch.

Figure 3:
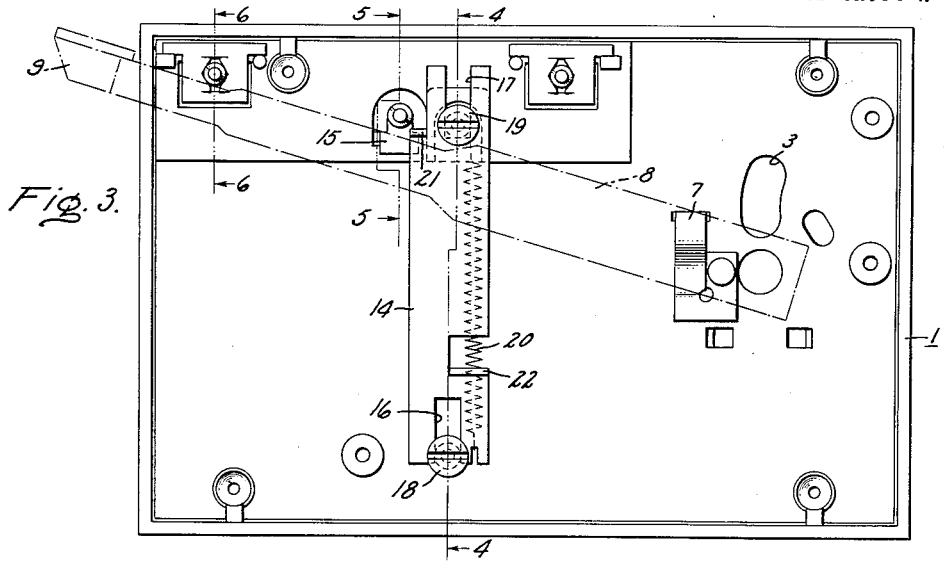
Fig. 3 is a rear elevation view of the can opener, with some of the parts broken away to show details of construction.

In accordance with my invention, an interlock arrangement is provided whereby pushbutton 11 may be depressed only after lever 8 has been shifted to its operative position as shown in Fig. 2. Thus inadvertent or accidental energization of the can opener while lever 8 is in its inoperative position is effectively prevented. As best shown in Fig. 3 an interlock plate 14 is mounted on the inner surface of the front wall of casing 1 for reciprocating movement between a first position in interfering engagement with a shoulder portion 15 of pushbutton 11 and a second position out of engagement with shoulder 15. Plate 14 is provided with slotted end portions 16 and 17 arranged to receive the shank portions of screws 18 and 19, respectively, and the plate is biased upwardly into engagement with screw 19 by means of a coil spring 20 secured at its lower end to the plate 14 and at its upper end to the portion of casing 1 through which screw 19 extends. Preferably, the interfering portion of plate 14 which normally overlies shoulder 15 of pushbutton 11 is provided with a bend over tab 21 so that plate 14 may slide easily from the lower position illustrated in Fig. 2 to the upper interfering position shown in Fig. 1.

In order to connect interlock plate 14 to lever 8 so that the interlock plate is shifted to its non-interfering position when lever 8 is moved downwardly to its operative position, there is provided a tab 22 on the interlock plate which may be conveniently formed by bending a portion of the plate out of the plane thereof. Tab 22 is positioned so that it is engaged by the lower edge of lever 8 as the lever is moved to its lower position. Suitable means are provided for detaining lever 8 in its lower position, such as an offset enlarged portion 23 at the bottom of the slot through which it extends, it being understood that the lever is laterally biased slightly so that it shifts into offset portion 23 (see Fig. 4) when moved to the position shown in Fig. 2. Thus, interlock plate 14 is shifted to and retained in the position shown in Fig. 2 when lever 8 is moved downwardly so as to position the cutter 2 in operative relation with respect to drive wheel 4. In this position, shoulder 15 of pushbutton 11 is free to move through the cutaway portion of interlock plate 14 formed by bending of tab 21 out of the plane of the plate. Thus, pushbutton 11 may be freely actuated when the cutting mechanism of the can opener is conditioned for a can opening operation, but is prevented from actuating switch 10 to its circuit closing position when lever 8 is in either an intermediate position or its raised position corresponding to the inoperative position of cutter 2.

While I have disclosed a presently preferred embodiment of my invention, I do not desire the invention to be limited to the particular construction illustrated and described herein, and I intend by the appended claims to cover all modifications within the true spirit and scope of my invention.

What I claim is:

1. A can opener comprising a casing, a cutter mounted at the front of said casing for movement between an upper inoperative position and a lower cutting position, a lever pivotally mounted on said casing and connected to said cutter, said lever having a manually operable handle and being movable between a first position in which said cutter is in its upper position and a second position in which said cutter is in its lower position, electrically powered means mounted on said casing for supporting and rotating a can with its lid in contact with said cutter, a switch within said casing arranged to control the supply of power to said electrically powered means, manually operable pushbutton means for actuating said switch to its "on" position, an interlock plate movable between a first position in interfering engagement with said pushbutton means in which actuation of said switch to its "on" position is prevented and a second position out of engagement with said pushbutton means, spring means biasing said interlock plate to its first position, and connecting means on said interlock plate engageable with said lever for shifting said interlock plate to its second position when said lever is moved to its second position.

2. A can opener as defined in claim 1 in which the free end of said lever extends through a slot in a side wall of said casing, said handle is secured to said free end, and said pushbutton means includes an actuator mounted on the front wall of said casing.

3. A can opener as defined in claim 2 in which said actuator includes a shoulder bearing against said interlock plate, and said interlock plate includes a cutaway portion through which said shoulder is free to move when the interlock plate is shifted to its second position.

4. A can opener as defined in claim 3 in which said interlock plate is generally rectangular in configuration, is mounted on the inner surface of the front wall of said casing for reciprocating movement parallel thereto, and said connecting means is a tab bent out of the plane of said reciprocating plate into the path of movement of said lever.

5. A can opener as defined in claim 2 in which said actuator is an elongated bar mounted for pivotal movement about an axis extending along the top edge of said casing.

No references cited.